(No Model.) 2 Sheets—Sheet 2.
F. WOOD.
SWITCH WORKER.
No. 532,934. Patented Jan. 22, 1895.
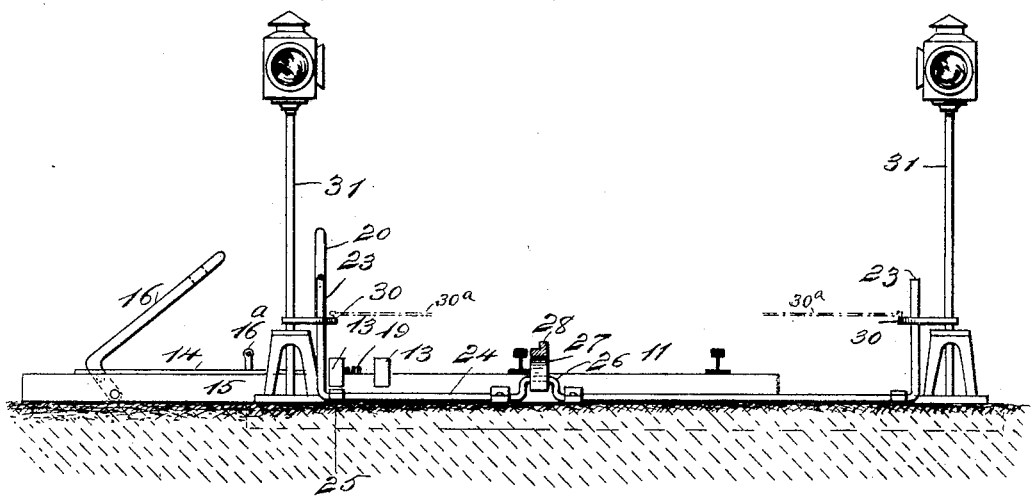
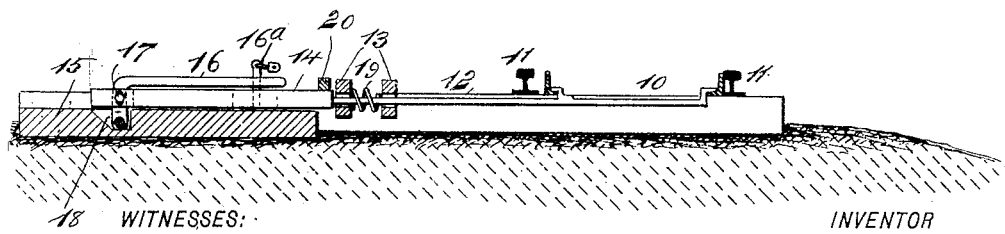
WITNESSES:
H. Walker
C. Sedgwick
INVENTOR
F. Wood
BY
Munn & Co.
ATTORNEYS.

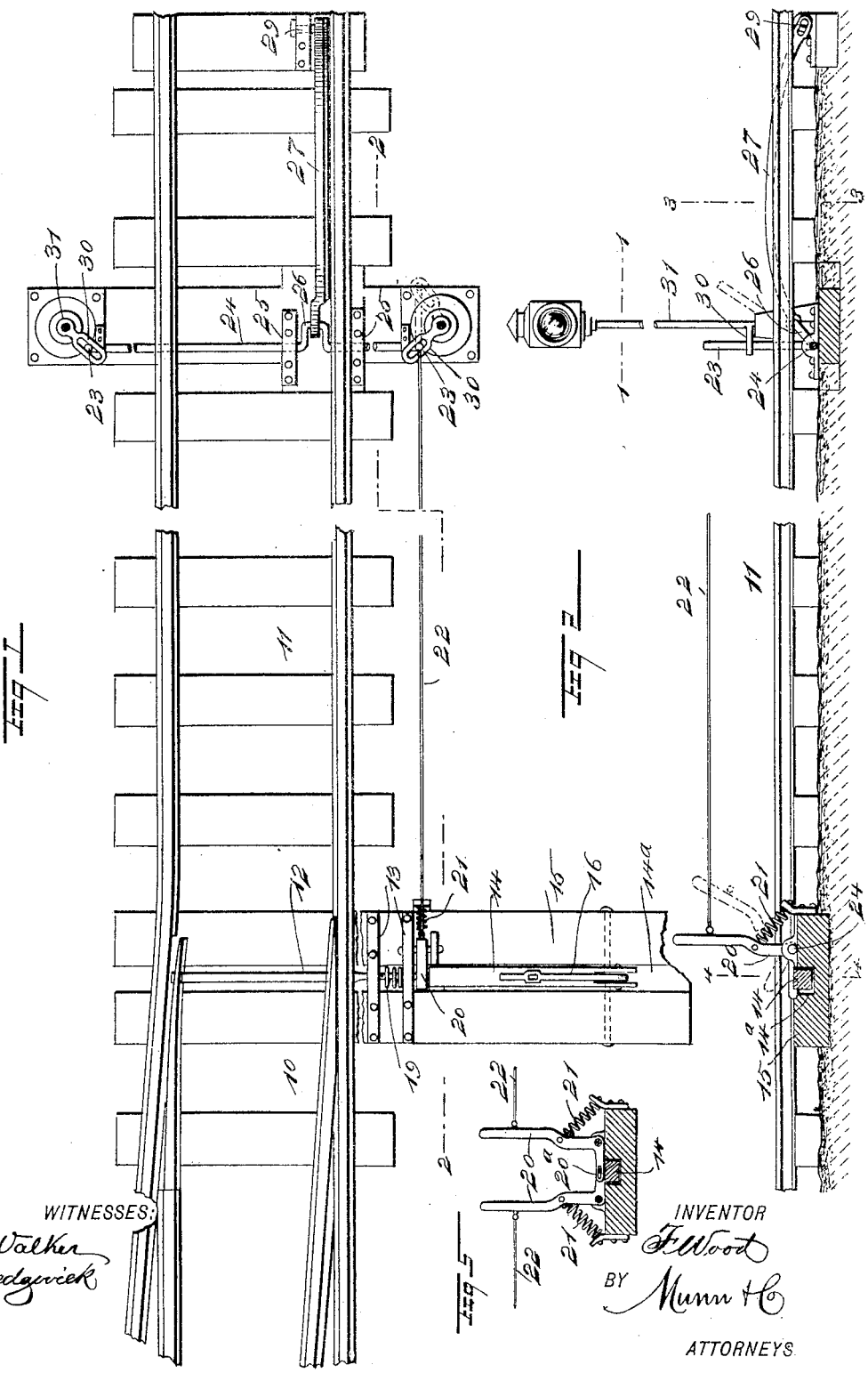

UNITED STATES PATENT OFFICE.

FRANK WOOD, OF MIDDLETOWN, NEW YORK.

SWITCH-WORKER.

SPECIFICATION forming part of Letters Patent No. 532,934, dated January 22, 1895.

Application filed April 9, 1894. Serial No. 506,886. (No model.)

*To all whom it may concern:*

Be it known that I, FRANK WOOD, of Middletown, in the county of Orange and State of New York, have invented a new and Improved Switch-Worker, of which the following is a full, clear, and exact description.

My invention relates to improvements in railway switches and mechanism for working them; and the object of my invention is to produce a simple apparatus which may be used in connection with the ordinary switch lever and signal post, and which may be operated by a passing train so as to automatically close an open switch and insure the safe passage of the train, the mechanism working also at the same time to shift the signal post so as to indicate safety.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a sectional plan of the apparatus on the line 1—1 of Fig. 2. Fig. 2 is a longitudinal section on the line 2—2 of Fig. 1. Fig. 3 is a vertical cross section on the line 3—3 of Fig. 2. Fig. 4 is a vertical cross section on the line 4—4 of Fig. 2; and Fig. 5 is a detail sectional view, illustrating the manner in which the tripping arms may be arranged in duplicate, so that the switch may be operated by a train on either side of the switch.

The switch 10 is of the ordinary kind and is arranged in the customary manner on the track 11, being moved by a switch bar 12 which is arranged in the ordinary way and projects outward through guide bars 13 and terminates in an enlarged end 14 which is preferably rectangular and slides in the recess 14ᵃ in the top of the guide block 15. The part 14 terminates in a small shoulder at its inner end, against which the tripping arm acts, as hereinafter specified.

The switch bar is provided with a hand lever 16 of the common kind, which is adapted to be locked to the post 16ᵃ and which is pivoted to the end portion 14 of the switch bar, as shown at 17 in Fig. 4, and has a depending end projecting into a recess 18 in the guide block 15 so that when the lever is raised the switch is opened. The above arrangement is substantially of the usual kind and I do not claim it.

The switch is normally closed and kept closed by a spring 19, which is arranged between the guide bars 13 and abuts with one of them and also presses against a boss or pin on the switch bar. When the switch is open it is held so by the bell crank or tripping arm 20 which is fulcrumed at its elbow on the guide block 15, and is adapted to swing down in front of the shoulder on the switch bar at the end of the part 14 thereof, the tripping arm being pressed into this position by a spring 21 which is arranged behind it, as shown best in Fig. 2.

The tripping arm 20 is connected by a rod 22 with the upturned crank 23 of a cross shaft 24, which is journaled in suitable bearings 25 on the track and extends transversely across the track, the shaft 24 being provided, adjacent to one of the track rails, with a crank 26 to which is connected the convex spring contact bar 27, which has a flange 28 thereon, see Fig. 3, to assist the wheel of an engine or car in properly striking it, and one end of this contact bar is pivoted, as shown at 29, see Fig. 2, on a support on the track and is slotted to provide for the necessary longitudinal movement.

It will be seen that when the wheel strikes and depresses the contact bar 27 it turns the crank 26 and crank shaft 24, thus actuating the crank arm 23, the rod 22 and tilting the tripping arm 20 so as to release the switch bar which, impelled by the spring 19, immediately closes the switch.

If desired a rod 22 and contact bar may be arranged on opposite sides of the switch bar and two tripping arms 20 used as shown in Fig. 5, these being connected together so that a train passing in either direction will work the switch. If the switch is already closed no harm ensues, as the ends of the bar slide on their supports, and the bar itself, being of spring material, buckles down.

The crank shaft 24 has a crank 23 at each end, so as to connect with the slotted arms 30 of signal posts 31 on opposite sides of the track, and consequently when the crank shaft actuated to turn the switch, it also works the signal in the usual way.

A wire 30ᵃ may be fastened to the crank arms 30 of the various signal posts along the track, see Fig. 3, so that when one signal post is moved, the next is similarly moved, and an engineer has early notice of the condition of the switch.

Having thus described my invention, I claim as new and desire to secure by Letters Patent—

1. The combination with a switch, and a spring pressed switch bar normally holding the switch closed, and provided with a shoulder of a pivoted and spring pressed bell crank having its horizontal member adapted to engage the shoulder of the switch bar to hold the switch open, a transverse shaft provided with cranks, a convex spring contact bar having one end pivoted adjacent to one of the rails and its other end connected to one of the cranks of the said shaft, and a rod connected to the vertical member of the bell crank and to one of the cranks of the said shaft, substantially as described.

2. The combination with a switch, and a spring pressed switch bar normally holding the switch closed, of a tripping arm adapted to engage the switch bar to hold the switch open, a transverse shaft provided with cranks at its ends, and one between its ends a pivoted contact bar having one end connected to the crank of the shaft, which is between its ends, a rod connected with one of the end cranks and with the tripping arm, and signal posts provided with arms with which the said end cranks engage, substantially as herein shown and described.

3. The combination with a switch, and a spring pressed bar provided with a shoulder, and normally holding the switch closed, of a bell crank arm adapted to engage with its horizontal member the shoulder of the switch bar to hold the switch open, a transverse shaft provided with a crank between its ends and one at each end a pivoted contact bar having one end connected to the crank of the shaft which is between its ends, a rod connected with one of the end cranks of the shaft and with the vertical member of the bell crank, and signal posts provided with arms having slots through which the end cranks of the shaft project, substantially as herein shown and described.

FRANK WOOD.

Witnesses:
JAMES G. MULFORD.
EDWIN S. MERRILL.